(No Model.)  4 Sheets—Sheet 1.
G. N. TODD.
COTTON HARVESTER.
No. 510,730. Patented Dec. 12, 1893.
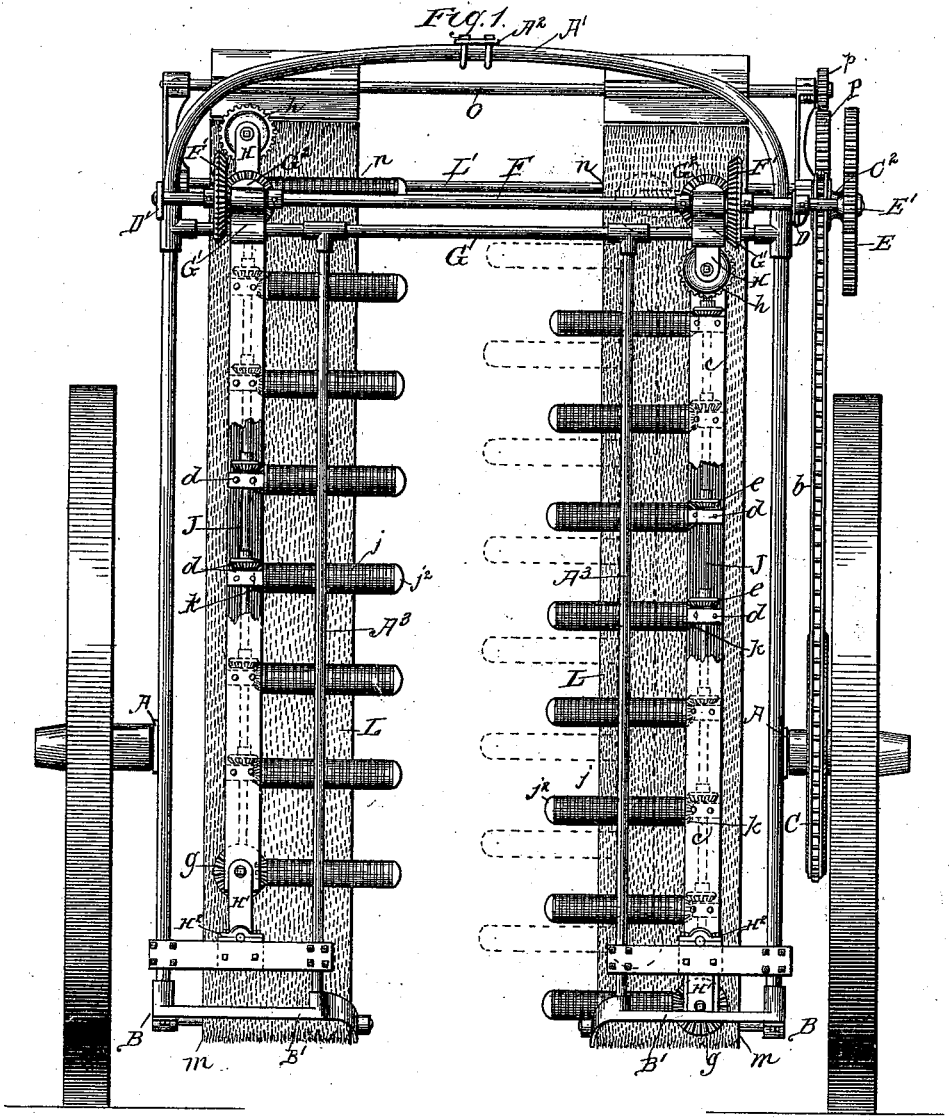
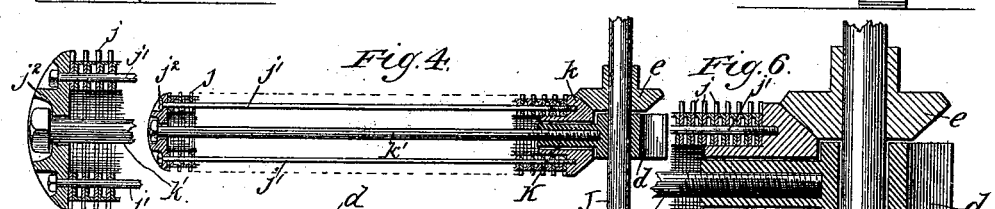
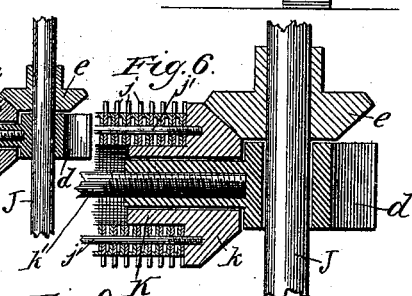
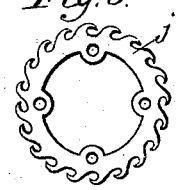
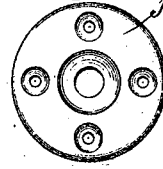
Witnesses.
Inventor.
George N Todd
By Jno. G. Elliott
Atty.

(No Model.) 4 Sheets—Sheet 2.
G. N. TODD.
COTTON HARVESTER.
No. 510,730. Patented Dec. 12, 1893.
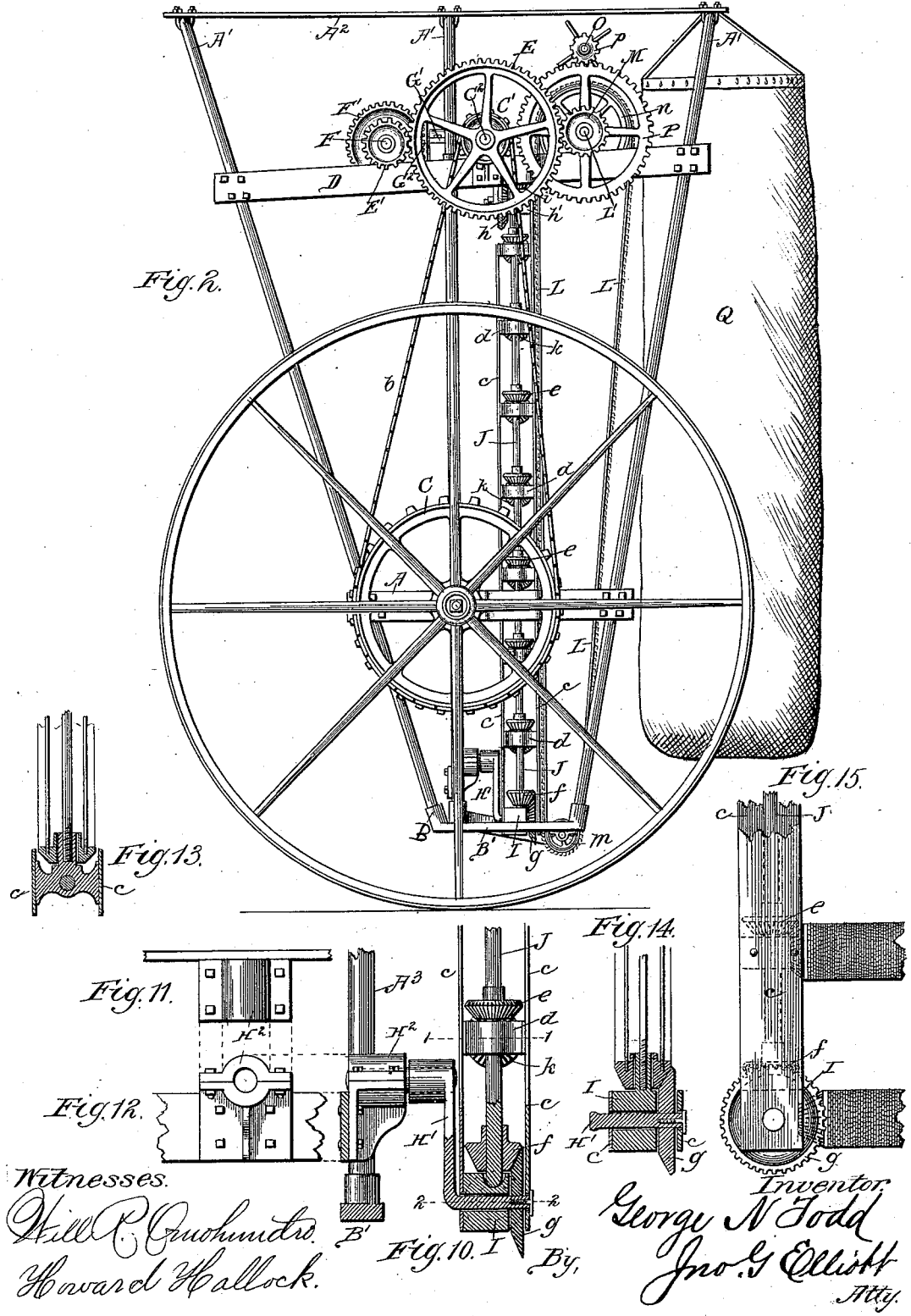

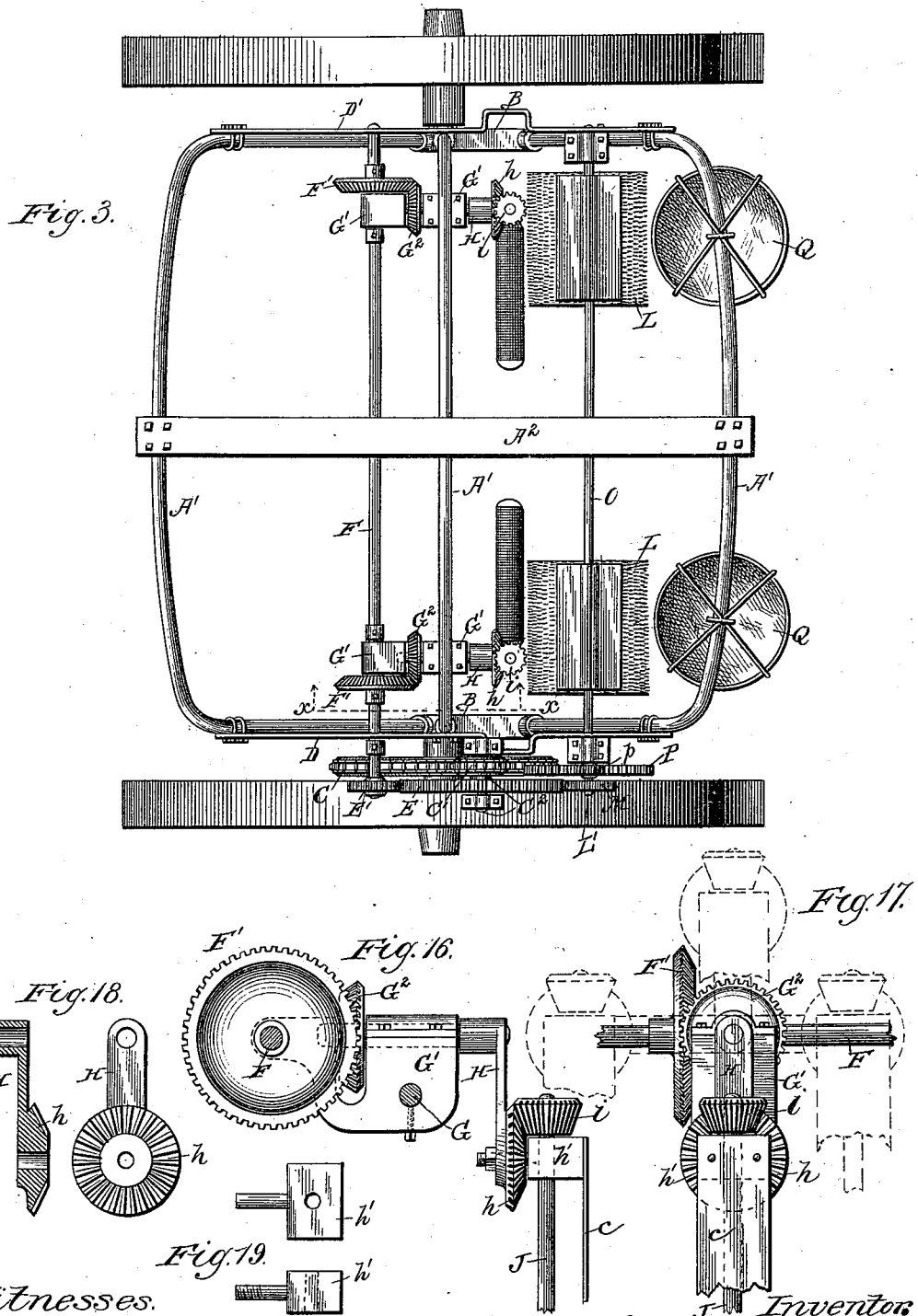

(No Model.)  
4 Sheets—Sheet 4.

G. N. TODD.
COTTON HARVESTER.

No. 510,730. Patented Dec. 12, 1893.

Witnesses.

Inventor.
George N. Todd
By Jno. G. Elliott
Atty.

United States Patent Office.

GEORGE N. TODD, OF CHICAGO, ILLINOIS, ASSIGNOR TO THE TODD COTTON HARVESTER COMPANY, OF ILLINOIS.

COTTON-HARVESTER.

SPECIFICATION forming part of Letters Patent No. 510,730, dated December 12, 1893.

Application filed July 13, 1885. Serial No. 171,561. (No model.)

*To all whom it may concern:*

Be it known that I, GEORGE N. TODD, a citizen of the United States, residing in Chicago, county of Cook, and State of Illinois, have invented certain new and useful Improvements in Cotton-Harvesters, of which the following is a specification.

This invention relates to improvements in cotton harvesters provided with picker stems which are revolved about their own axes and have an end thrust into the bush from each side thereof.

The objects of this invention are, to have an inward and gradually rising thrust of the picker stems in rapid succession, while at the same time said stems are maintained in a horizontal position and revolved about their own axes, whereby cotton is picked rapidly and effectively as the stems revolve and rise in the bush while they are at the same time carried forward by the travel of the machine; to provide a picker stem of novel construction, combining lightness and strength, revolving upon a central spindle or shaft, which spindle serves to sustain the stem in a horizontal plane, and, finally, to simplify the construction of the machine as a whole and give the several parts thereof the desired movement both in direction and speed by certain details of construction hereinafter described, in which—

Figure 20:
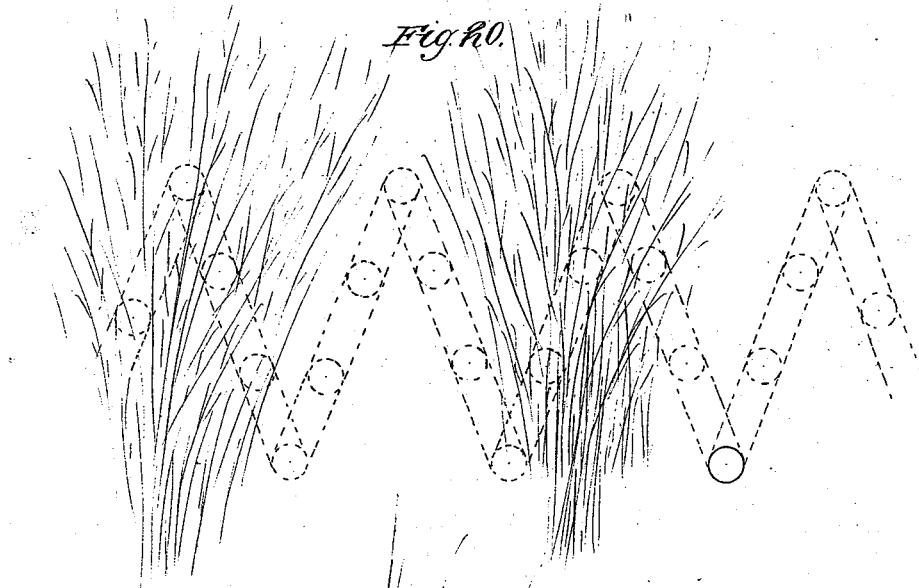
Figure 21:
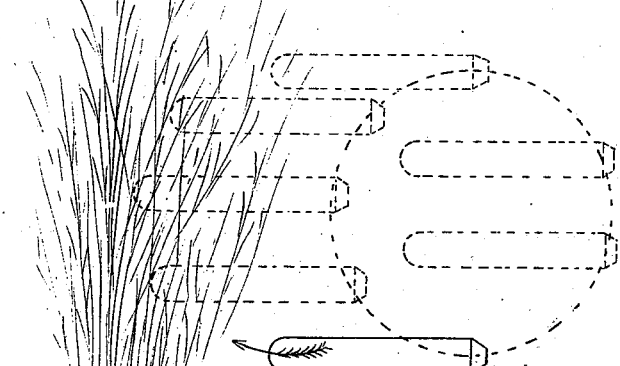
Figure 22:
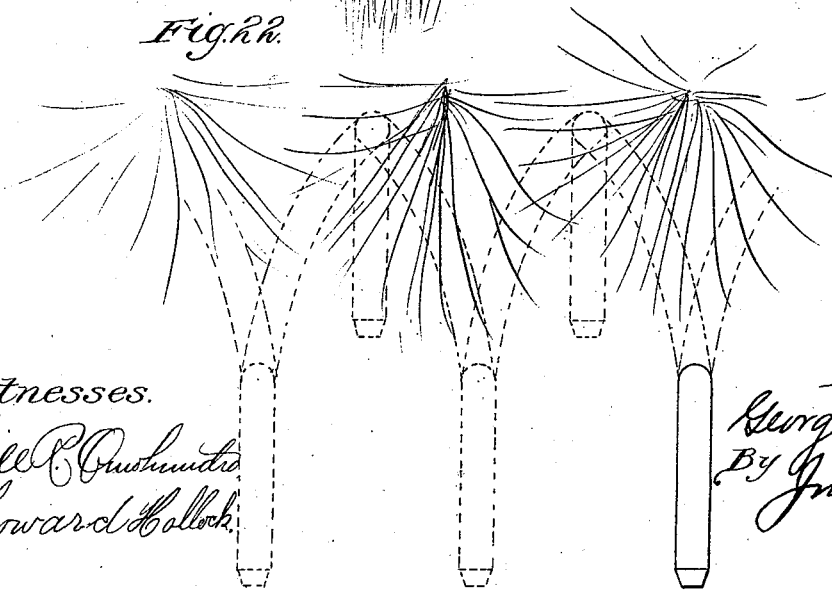

Figure 1 represents a front elevation of a cotton harvester embodying my invention; Fig. 2, a side elevation of the same; Fig. 3, a top plan view of the same; Fig. 4, a detail central vertical section taken through one of the picker stems and a portion of the mechanism for revolving the same; Fig. 5, an enlarged detail section of the forward or free end of one of the picker stems; Fig. 6, an enlarged detail of the rear end of the picker stem and driving mechanism therefor illustrated in Fig. 4; Fig. 7, an end and plan view of the bearing for the rear end of the picker stem; Fig. 8, a detail elevation of one of the annular tooth plates of the picker stem; Fig. 9, a detail front view of the end plate or cap of the picker stem; Fig. 10, a detail view partly in section, of the shaft supporting the picker stems and the crank arm and bearing block at the lower end of said shaft; Figs. 11 and 12, a plan view and end elevation, respectively, of the crank arm box or bracket; Fig. 13, a horizontal section of a picker stem and its bearing on the line 1—1 of Fig. 10; Fig. 14, a detail section of the same on line 2—2 of Fig. 10; Fig. 15, a detail side elevation of the picker stems and the side bars in which the bearing blocks are bolted and the lower end of the shaft is supported; Fig. 16, a detail side elevation of the upper crank arm, the picker stem drive shaft and the gears for actuating said shaft and crank arm; Fig. 17, a front elevation of the same; Fig. 18, a section and rear elevation of the crank arm and the bevel gear thereon; Fig. 19, a section and plan view of the bearing block at the upper end of the shaft provided with a pin projecting through the gear on the crank arm; Figs. 20, 21 and 22, diagrams illustrating the movements of the picker stems during their operation.

Similar letters of reference indicate the same parts in the several figures of the drawings.

The harvester herein described is of the class commonly known as straddle-row, and is designed to be supported upon but two wheels, the short axles of which are formed with or secured to horizontal bars, A. (See Fig. 2.) These bars are secured at a suitable height from the ground, by bolts or otherwise, to the frame supporting the operating parts of my machine. It consists of three arches, A', widely separated at the top or center of the arches and tied together at suitable points by the bars, A, A², D and D'. The free or lower ends of these arches converge, and are screwed or otherwise secured in sockets provided in the casting, B. One arm of this casting, B', extends inwardly in a horizontal plane at right angles to the frame, and has secured in a socket provided thereon one end of a tie rod, A⁸, which rod extends upwardly therefrom to a brace or cross rod, G, extending transversely across the machine and connecting the two sides of the center arch, to which rod is secured the said tie rod A³.

Rigid on one of the wheel hubs is the usual driving sprocket, C, connected by a drive-chain, $b$, with a small sprocket, C', secured on a short shaft, C², journaled in a suitable box secured to bar D toward the upper end of the frame.

On the outer end of the shaft $C^2$ is a large cog-wheel, E, which gears with a small cog, E', on a shaft, F, which extends transversely across the machine and is journaled in a bar, D', the counterpart of the bar D; the main bearings of the shaft, however, being in the blocks, G', hereinafter described, and these several shafts, sprockets and gears constitute the main driving mechanism for the picker stems with which the shaft F is geared as will now be described.

Toward each end of the shaft F are large bevel gears, F', meshing with smaller bevel gears, $G^2$, rigid upon a crank arm, H, journaled in a fixed bracket, G', forming at one end the bearing for the shaft F, and rigidly secured upon a transverse brace-rod, G, at the upper end of the machine by a suitable set-screw.

Secured to or formed with and extending inwardly at a right angle from the bar B is an arm, B', to the inner end of which is secured a perpendicular tie rod, $A^3$, hung from the brace-rod G, and with these several parts forming a support for the lower crank arm, H', (see Fig. 10,) journaled in a suitable box, $H^2$. Sleeved on this crank arm is a block, I, which forms one end of a frame composed of two perpendicular strips, c, between which are rigidly bolted at suitable intervals castings, d, which constitute the bearings for the picker stems and actuating shaft, J, and the block I an end bearing for the actuating shaft J of the picker stems; which shaft is provided at intervals with bevel gears, e, corresponding in number with the picker stems employed, and at its lower end with a bevel gear, f, meshing with a similar gear g rigid upon the crank arm and between the block I and the strip c of the picker stem frame.

The upper crank arm H has cast thereon, or otherwise secured thereto, (see Figs. 16 and 18,) a bevel gear, h, provided with a central perforation receiving a pintle cast with or rigid upon a block, h', loosely journaled in the said gear h, constituting the end piece of the upper end of the picker stem frame and a bearing for the drive shaft thereof, which shaft has on its end projecting above said block a bevel gear, i, meshing with the gear h.

The picker stems are so constructed as to effectually resist any lateral strain from an end thrust into a bush, and in the present instance consist of a series of annular toothed disks, j, (see Figs. 4, 6 and 8,) secured together by tie rods, j', passing through an end plate or cap, $j^2$, screwed into a bevel gear, k, which gear constitutes the butt end of the picker stem and meshes with a gear, e, on the drive shaft J, the said gear being sleeved upon a pintle K projecting inwardly from the block d in the picker stem frame. Passing axially through the cap or end plate $j^2$ is a rod k' screwed into the pintle bearing, K, projecting from the block d, which, as before stated, constitutes the support and bearing for the picker stem.

From the construction described, it will be seen that the picker stems are not only revolved about their own axes, but they have an inward thrust during their operation and the forward travel of the machine.

As the machine moves forward the upper crank arm H, being pivoted to and otherwise fixed with reference to the picker stem frame, carries with it said frame and in so doing, its gear meshing with the gear i of the drive shaft, actuates said shaft, which causes the stems to revolve on their own axes. As the picker stem frame is raised and lowered, it actuates the lower crank arm H', but, without some means for throwing said crank arm off its dead centers, there would be a liability of the lower end of the picker stem frame swinging out of alignment; to prevent which is employed the gear, g, on the lower crank arm meshing with the gear f, as before described. When the crank arms are on their upper dead centers, if the lower crank arm were not geared it would be free to fall on either side of its dead centers; whereas it should move forward in the same direction with the upper crank arm; but by having the geared connection between the two crank arms, the drive shaft of the picker stems is caused to actuate the lower crank arm positively when on its dead center and carry it forward over the dead center with the upper crank arm; and but for this purpose the gearing upon the lower crank arm might be omitted.

In practice it is proposed that the picker stems on each side of the machine shall make their thrust alternately, for by so doing the machine is so much relieved from strain that it may be made lighter and run with much less power than if they had a simultaneous forward thrust, but I do not limit myself to the particular manner of operating the machine just described.

In Figs. 20, 21 and 22 are diagrams illustrating as nearly as possible the movement of the picker stems, their lateral movement owing to the forward travel of the machine being indicated in Fig. 20, in which, as shown, the picker stem enters from the bottom of the bush and rises, owing to the crank movement, on an oblique line toward the top of the bush; whence it descends at a like angle and again rises, and so on. In its longitudinal movement, as indicated in Fig. 21, the picker stem travels on a circle in making its forward and backward thrust, while at the same time, as shown in Fig. 21, its point moves on a line approximately a double ellipse. By combining these several movements in a picker stem, as described, I am enabled in rapid succession to reach every portion of a cotton bush and without injury to the same; for in practice, in the machine shown, the thrust of the picker stems is designed to be very rapid, or, in other words, they will complete a forward and backward thrust while the machine is traveling forward a few inches. Picker stems operating so rapidly require that some means shall be provided for relieving them of the cotton gathered before making a second thrust; and, to this end, I employ an endless band, L, of card-cloth extending from the lower picker stem to above the upper stem, which band or belt passes around an idle pulley, $m$, and at its upper end about a large pulley, $n$, rigid upon a shaft, L', which carries upon its outer end a pinion or small gear, M, meshing with the gear E before described; whereby the belt is actuated quite rapidly and sufficiently to relieve the picker stems from their load the moment they begin their backward stroke, at which moment they come in contact with and are drawn across the gathering belt, which then elevates its load and has a discharge as now to be described. Mounted above the shaft L' is a similar shaft, O, the outer end of which carries a pinion, $p$, meshing with a large gear, P, on the shaft L'. Shaft O carries a series of wings which operate to knock or blow off the cotton from the belt at the point where such wings are located; and, in order to catch the cotton, I suspend within convenient reach of said wings or fans a bag, Q, or may be a basket of any construction or form adapted for the purpose indicated.

Having thus described my invention, what I claim, and desire to secure by Letters Patent, is—

1. The picker stems, the drive shaft thereof and the picker stem frame provided with an end block having a pintle, in combination with a crank arm, a gear thereon engaging the drive shaft, said gear being sleeved upon the pintle of the end block, substantially as described.

2. A picker stem consisting of an end-cap and butt gear connected together, and alternate toothed disks and guards united together and confined between said cap and gear, in combination with a fixed rod passing axially through said stem and constituting a bearing and support therefor, substantially as described.

3. A hollow picker stem consisting of a cap at one end and a gear at the opposite end constituting the butt, said cap and gear being connected by rods upon which are mounted annular toothed disks and guards, in combination with the frame, and a fixed rod, secured thereto passing axially through said stem but supporting the same at the ends, substantially as described.

4. In a cotton harvester, the vertical cleaning belt driven by the belt pulley $n$ on shaft L', said shaft receiving its power from the main driving cog, E, in combination with the fan wheel carried upon the shaft O, said shaft being driven by a gear upon the shaft L', substantially as described.

5. The vertical picker stem frame the picker stems journaled therein, the crank arms carrying said frame, and a gear connection between said arms and the picker-stems for causing an axial rotation of said stems, in combination with the cross-shaft, F, having a gear mounted thereon a gear secured to and having an axis common to the axis of rotation of said arms for engaging said shaft-gear, and means for actuating said shaft, substantially as described.

GEORGE N. TODD.

Witnesses:
W. W. ELLIOTT,
W. H. YOUNG.